United States Patent [19]
Correia

[11] 3,828,733
[45] Aug. 13, 1974

[54] PORTABLE MILKING STALL

[76] Inventor: Manuel G. Correia, 13075 Ave. 200, Tulare, Calif. 93274

[22] Filed: May 15, 1972

[21] Appl. No.: 253,408

[52] U.S. Cl. ............................. 119/14.03, 119/27
[51] Int. Cl. ........................................ A01j 05/00
[58] Field of Search .............. 119/14.03, 15, 16, 27

[56] References Cited
UNITED STATES PATENTS

| | | | |
|---|---|---|---|
| 1,043,293 | 11/1912 | Boyce | 119/15 |
| 2,969,039 | 1/1961 | Golay | 119/14.03 |
| 3,019,763 | 2/1962 | Ferris | 119/14.03 |

FOREIGN PATENTS OR APPLICATIONS

| | | | |
|---|---|---|---|
| 23,923 | 10/1962 | Germany | 119/14.03 |

Primary Examiner—Hugh R. Chamblee
Attorney, Agent, or Firm—Herbert A. Huebner et al.

[57] ABSTRACT

A pre-fabricated milking stand characterized by a pair of laterally spaced, elongated and elevated milking stalls, each stall being supported by skids for accommodating its displacement into an operative environment, and restraining means for simultaneously restraining a plurality of obliquely oriented cows, whereby access to their udders is afforded for milking purposes. A particular feature of the invention resides in the portability of the milking stand which facilitates conversion of "flat" milking barns to "herringbone" milking barns, at minimal economic costs.

3 Claims, 7 Drawing Figures

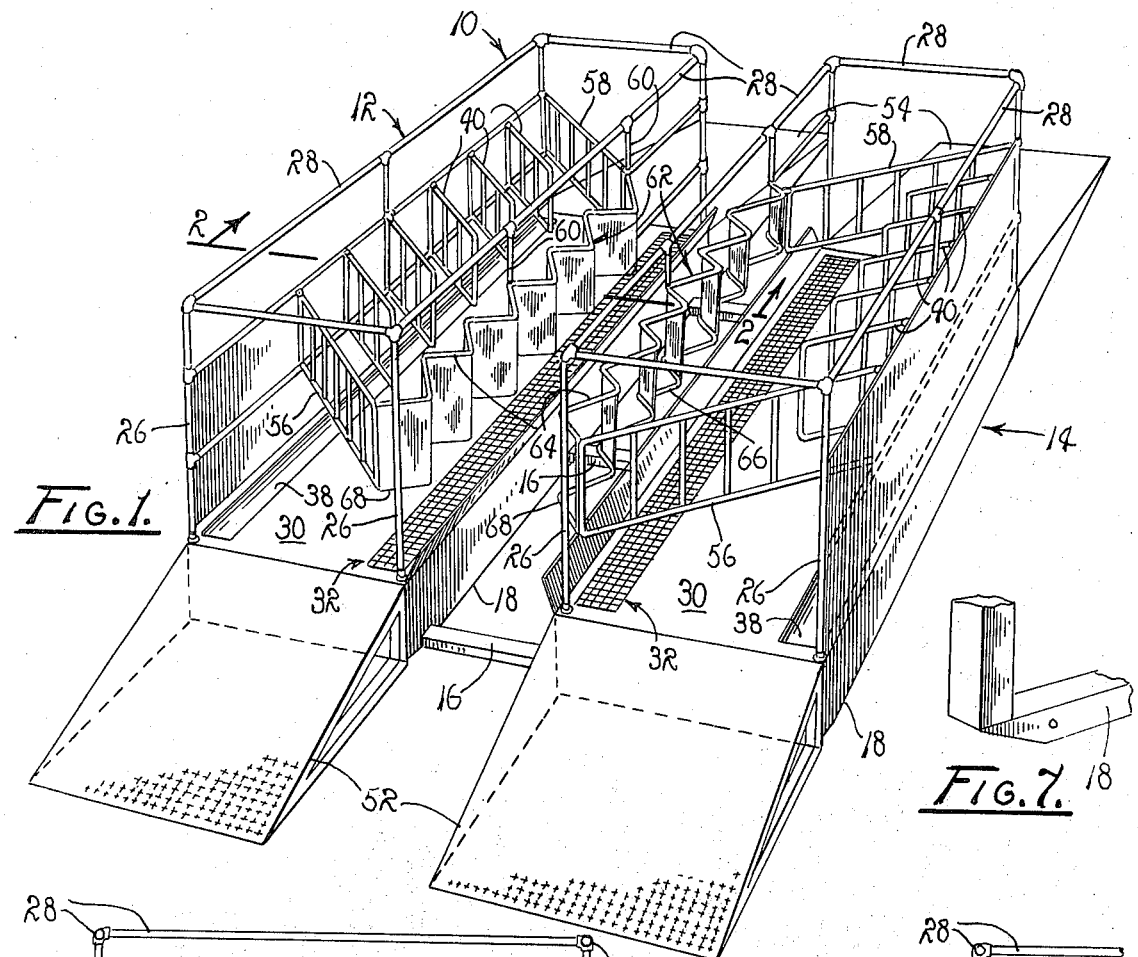
Fig. 1.
Fig. 7.
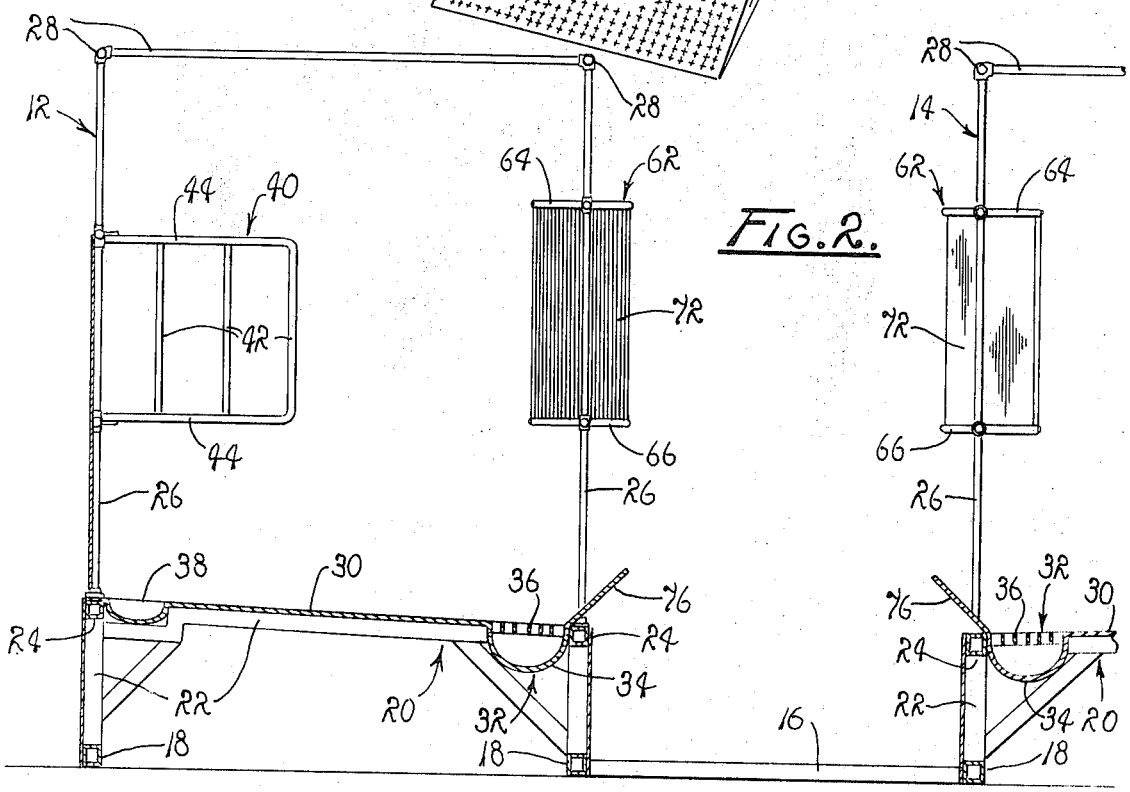
Fig. 2.

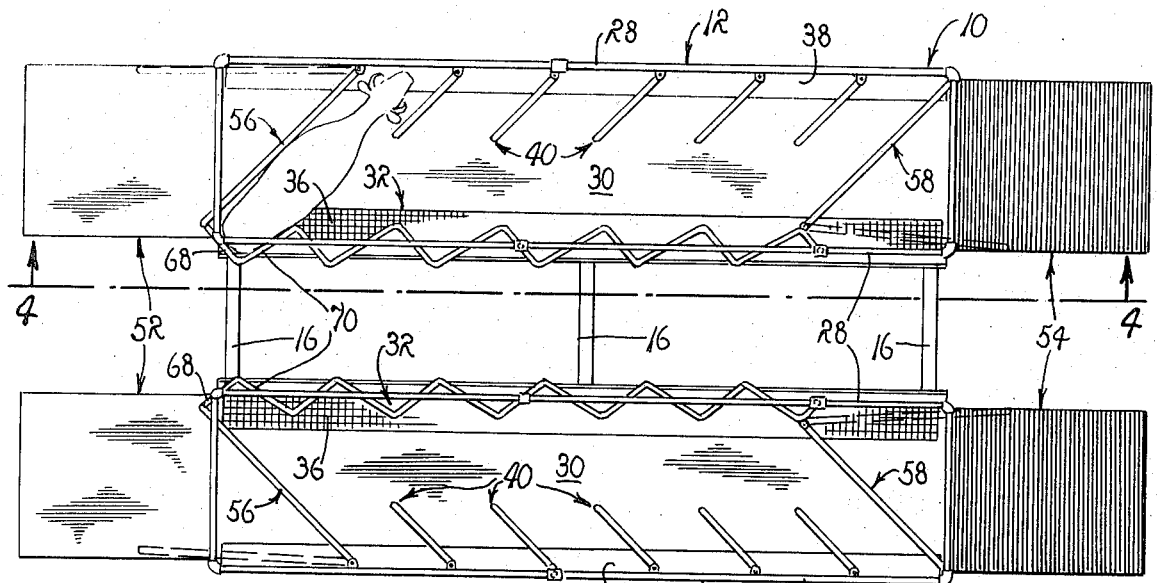
Fig. 3.
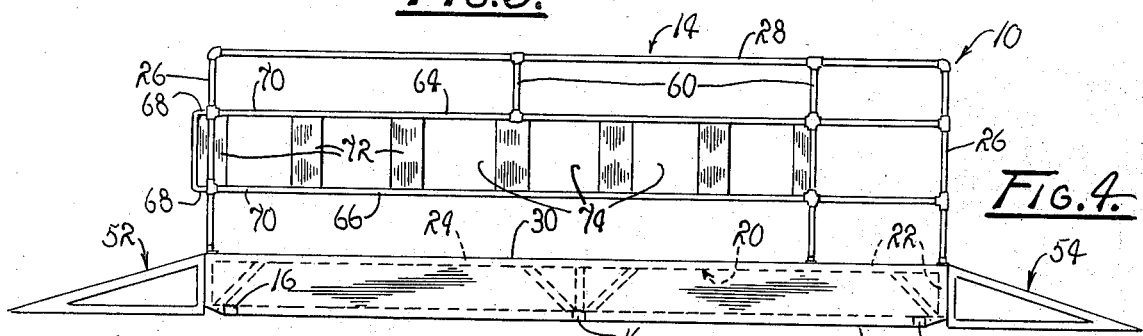
Fig. 4.
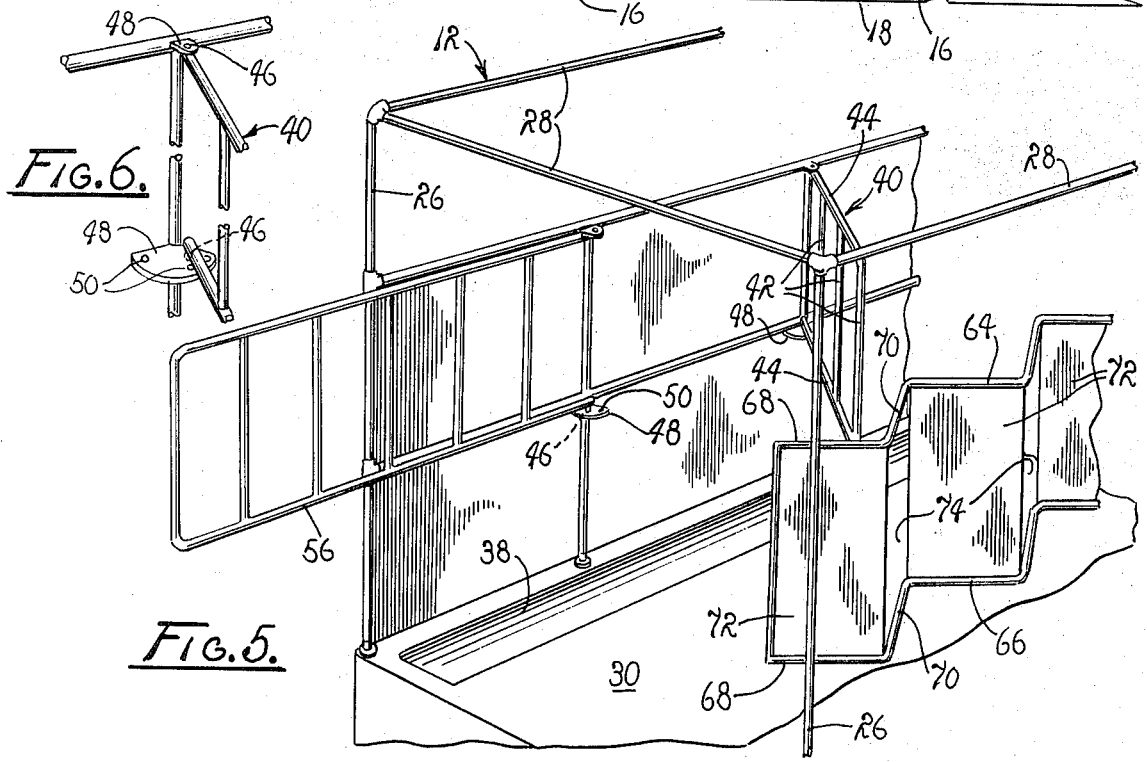
Fig. 6.
Fig. 5.

PORTABLE MILKING STALL

BACKGROUND OF THE INVENTION

The invention relates, generally, to milking barns, and more particularly to a pre-fabricated milking stand adapted to be transported into an operational environment at a second location, whereby milking barns economically can be converted from the "flat" barns to the so-called "herringbone" milking barns.

The so-called "flat" milking barns are notoriously old. Such barns normally include a plurality of coplanar stanchions into which cows' heads are inserted during milking operations for restraining the cows against motion. Frequently, feeding and milking operations are performed concurrently. However, as the size of dairy herds increase, competition for milking space tends to increase proportionately. Consequently, various efforts have been made to bring the cows closer together, while yet accommodating an access to their udders for facilitating mechanical milking operations.

One of the techniques frequently employed in an attempt to solve inherent problems arising out of a lack of sufficient milking space is to orient the cows to be milked in an elevated, herringbone orientation. In this orientation, the cows are obliquely related to the longitudinal axis of their milking stalls so that the cows can be brought into close proximity, while access to their udders readily is facilitated for receiving cups of mechanical milking machines.

As can readily be appreciated by those familiar with the dairy industry, conversions of the "flat" barns to "herringbone" barns is time consuming, substantially expensive, and often imposes an intolerable loss of time. As a consequence, remodeling operations preferably are avoided. Hence, herringbone barns are provided only through new construction, which frequently is economically prohibitive.

In view of the foregoing it should readily be apparent that there currently exists a need for a pre-fabricated milking stand which can economically be fabricated in a machine shop and thereafter readily installed within a milking barn for rapidly and economically converting the milking barn from a "flat" to a "herringbone" barn.

SUMMARY OF THE INVENTION

It is therefore an object of the instant invention to provide a portable milking stand.

It is another object to provide an improved portable milking stand for use in converting "flat" barns to "herringbone" barns.

It is another object to provide a portable milking stand which includes multiple, pre-fabricated milking stalls particularly suited for converting "flat" barns to "herringbone" barns.

It is another object to provide a portable milking stand which is fabricated at points remote from the milking barn and thereafter rapidly and economically installed within a milking barn for providing therewithin a milking stand suited to support a plurality of cows in a "herringbone" orientation.

Another object is to provide a portable milking stand particularly suited to be employed at a plurality of locations and transported therebetween.

These and other objects and advantages are achieved through the use of a portable milking stand which includes a pair of laterally spaced milking stalls, each including a laterally extended, elevated floor and a plurality of parallel gates for receiving therebetween a plurality of milchcows obliquely related to the longitudinal axis of the milking stalls, and supporting skids for supporting each of the milking stalls for independent displacement.

DESCRIPTION OF THE DRAWINGS

FIG. 1 is a perspective view of a portable milking stand which embodies the principles of the instant invention.

FIG. 2 is a partial end elevation, on an enlarged scale, of the milking stand shown in FIG. 1.

FIG. 3 is a top plan view of the milking stand of FIG. 1.

FIG. 4 is a side elevation taken generally along lines 4—4 of FIG. 3.

FIG. 5 is a fragmented, perspective view, on an enlarged scale, of one of the stalls of the milking stand shown in FIGS. 1 through 4.

FIG. 6 is a detailed view of a coupling employed in supporting separator panels and gates employed in the milking stand.

FIG. 7 is a fragmented, perspective view of one end portion of a skid employed in supporting one of the milking stalls of the instant invention.

DESCRIPTION OF THE INVENTION

Referring now to the drawings wherein like reference characters deisgnate like or corresponding parts throughout the several views there is shown in FIG. 1 a portable milking stand generally designated 10 which embodies the principles of the instant invention.

It is to be understood clearly that while the milking stand 10 is particularly suited for use in converting the so-called "flat" barn to the "herringbone" barn, the stand 10 also can be employed in any instance wherein it is desired to provide a "herringbone" milking barn in an economic and expeditious manner for use in performing milking operations. Of course, such instances normally occur during periods of conversion from "flat" to "herringbone" barns, however, they also occur during construction of new barns. Furthermore, the milking stand of the instant invention can be employed beyond the confines of a barn, such as in open pastures and range lands. Therefore, it is to be understood further that while the stand 10 has particular utility in converting "flat" to "herringbone" barns, the utility of the stand is not so limited.

The milking stand 10 includes a first milking stall 12, and a second milking stall 14 laterally spaced therefrom. The stalls 12 and 14 are integrated into a rigid unit through a plurality of transverse base beams 16 extending therebetween. As a practical matter, the stalls 12 and 14 are of an elongated configuration and the base beams 16 are of substantially equal lengths so that the stalls 12 and 14 operatively are arranged in substantial parallelism within the stand. Consequently, the stall 14 appears as a mirror image of the stall 12.

Furthermore, the stalls 12 and 14 can be arranged in coaxial alignment, as well as in a laterally spaced orientation so that the portable stand 10 can be suitably configured, employing as many of the stalls as desired. Thus, the stand 10 is particularly suited for pre-fabrication and subsequent final assembly and installation at a desired location.

The stalls 12 and 14 are quite similar in design, and function in substantially the same manner within the portable stand 10. It is, therefore, to be understood that the stall 14 includes substantially the same structural members employed in the substantially same manner as the structural members provided for and employed in the stall 12. Thus a detailed description of the stall 14 is omitted in the interest of brevity.

Turning to FIG. 2, it can be seen that the stall 12 is provided with a pair of skids 18. These skids serve as a sill for the stall and support the stall on the barn floor. The skids 18, as a practical matter, can be formed of any suitable material and structural shapes, including angle iron, box beam, channel iron, timbers and any suitable combination of such members. The purpose of the skids 18 is to support the stall 12 while accommodating its lateral displacement so that it can be positioned at any selected location and thereafter coupled with the adjacent stall 14 through the plurality of the base beams 16 extended therebetween and coupled therewith.

Extending vertically from the skids 18 is a welded truss-like framework 20 which, together with the skids 18, form the load supporting base for the stall 12. As a practical matter, the framework 20 includes a plurality of horizontal, vertical and diagonal construction beams 22 suitably positioned and oriented in a manner totally consistent with known engineering design principles and fabrication techniques. Also included within the framework 20 is a plurality of horizontally extended beams 24 welded or otherwise suitably coupled with the beams 22. These beams serve as sills from which is extended a plurality of vertical supports 26. In practice, the vertical supports 26 are formed of any suitable material such as galvanized pipe and the like. A support 26 is employed at each corner of the stall 12 for providing the desired support. Use of the vertical supports 26 along the side of the stall 12 which faces the adjacent stall 14 is not preferred, since these members tend to impede access to cows confined therewithin. However, as many supports 26 as are desired are provided along the opposite side thereof.

The vertical supports 26 preferably are coupled together through a plurality of horizontal supporting beams 28 laterally extended therebetween. The beams 28 are, in practice, fabricated from galvanized pipe and the like, however, it is to be understood that any suitable material can be employed equally as well.

Also supported by the framework 20 is a floor 30 upon which the cows stand as they are confined for milking operations. As best shown in FIG. 2, the floor 30 of each of the stalls 12 and 14 is inclined toward a gutter 32. This gutter is provided for conducting fluid waste away from the supporting surface of the floor 30 for apparent practical sanitary reasons. As a practical matter, the floor 30 is fabricated from suitable steel deck plate, of a practical thickness, and is welded in place to the framework 20. Accordingly, the framework 20 is suitably dimensioned to impart the desired inclination to the floor 30.

As a practical matter, the gutter 32 conforms to an elongated, trough-like configuration which includes an open-top conduit 34 fabricated from suitable materials, such as sheet steel and the like. Across the opening of the conduit there is provided a rigid grate 36 upon which the cows are permitted to stand. Due to the inclination of the floor 30, waste liquids normally encountered during milking and clean-up operations are directed into the gutter and received thereby.

While not shown, it is to be understood that the gutter 32 also is slightly inclined toward a discharge opening, also not shown, to which is affixed a suitable conduit such as a flexible hose for conducting the waste fluid beyond the vicinity of the milking stand 10. While the flexible hose has not been illustrated, its use is in practice determined by the requirements imposed as a consequence of the environment in which the stand 10 is being employed. Therefore, and where so desired, the gutter 32 is often permitted to discharge directly onto the supporting surface upon which rests the skids 18.

As a practical matter, an elongated trough 38 is extended along the edge of the floor 30 opposite the gutter 32 and is employed as a receptacle for minerals, feed, water, or any other material normally consumed by the cows during milking operations. The particular manner in which the trough 38 is fabricated is a matter of convenience only and is dictated by the particular material to be confined therewithin. As shown, the trough 38 is fabricated from a continuous sheet of material and is similar in configuration to the conduit 34. Where preferred, the trough 38 is welded in place.

It will of course be appreciated that the vertical supports 26 serve to support the horizontal beams 28 extending transversely across the ends of the stalls at elevations such that the cows are unimpeded thereby as they enter and exit from the stall 12. However, the horizontal beams 28 extended along the edge of the stall 12, opposite the gutter 32, are so arranged as to impede passage of the cows. Thus the cows are restrained against passage across the side edges of the stalls.

While it is entirely possible to provide a plurality of juxtaposed stanchions for receiving the heads of the cows, it has, in practice, been found practical to separate the cows through a plurality of separator panels 40 disposed in substantial parallelism and obliquely related to the longitudinal axis of symmetry of each of the stalls 12 and 14. Each of these panels is of a lightweight construction, preferably fabricated from a suitable plurality of mutually spaced, vertically oriented tubular members 42 and a pair of horizontally oriented transverse members 44. If desired, the members 42 and 44 also can be fabricated from galvanized pipe and the like.

As best illustrated in FIG. 3, the horizontal length of the panels 40 is such as to confine the forward portions or heads of the cows as they are confined within the stalls 12 and 14. In practice, the panels 40 are, where so desired, welded in place. However, as illustrated, the panels 40 preferably are pivotally supported by a suitable plurality of vertical support members 26 through the use of coaxially aligned hinge pins 46. These pins are supported by vertically spaced hinge plates 48 welded or otherwise affixed to the vertical supports 26.

In instances where the separator panels 40 are pivotally supported through the use of hinge pins 46 and hinge plates 48, it is desirable to provide suitable stops 50 for arresting lateral displacement of the panels. As shown in FIG. 6, the stops 50 are welded to the hinge plate 48 and are of a height such that the panels 40 can be manually lifted, about the pins 46, relative to the plates 48 and the stops 50, as the panels are pivoted about the hinge pins 46. Thus, the panels 40 can be displaced pivotally about the hinge pins 46 to a desired disposition and supported in a selected relation with the longitudinal axis of the stalls.

It is to be appreciated that regardless of whether the panels 40 are fixed in place, by welding and the like, or are pivotally supported for displacement about the hinge pins 46, the cows are caused to enter the stall 12 from one end and exit at the opposite end of the stalls. To accommodate such passage of the cows through the stalls 12 and 14, each of the stalls is provided with an entrance ramp 52 and an exit ramp 54 across which the cows pass as they file in and out of the stalls.

In order to confine the cows against passage from the stalls 12 and 14, during milking operations, while yet accommodating their exit once milking operations are completed, there is provided a pair of gates 56 and 58. These gates also are pivotally supported at the opposite ends of the stalls by hinge pins 46 and hinge plates 48 of the type hereinbefore described with respect to supporting of the panels 40. When positioned to confine the cows within the stalls, the gates extend diagonally across the width of the stall and are supported by a suitable latching mechanism, not designated. In practice, the hinge pins 46 employed in supporting the gate 58 are supported by a plurality of hanger rods 60, FIG. 1, which depend from a horizontal beam 28 for supporting a laterally extended, rump restrainer 62.

The rump restrainer 62 extends along the side of the stalls 12 and 14 opposite sides from which the panels 40 extend. The rump restrainer 62 is configured to receive and support against selected lateral movement the rumps of a plurality of cows during milking operations. As illustrated, the rump restrainer includes a pair of horizontally extended, vertically spaced transverse beams 64 and 66, FIG. 5. The transverse beams 64 and 66 include a plurality of first segments 68 which traverse the longitudinal axis of symmetry of the plurality of cows restrained within the stalls 12 and 14 and second segments 70 which substantially parallel the longitudinal axis of symmetry of the cows. As shown in the drawings, the segments 70 are extended generally parallel with the planes of the panels 40. Hence, the rump of each cow is confined against motion in both lateral and rearward directions by the rump restrainer 62.

Between the segments 68 of the transverse beams 64 and 66 there is provided a plurality of splash plates 72. These plates serve to deflect waste discharged from the cows, during milking operations, downwardly into the gutter 32 disposed therebeneath. As a practical matter, the splash plates 72 are fabricated from suitable sheet metal welded or otherwise affixed to the beams 64 and 66. It is important here to note that between the segments 70 of the transverse beams 64 and 66, respectively, there exists an access opening, designated 74 which affords access to the udders of the cows for accommodating milking operations.

Arranged to cooperate with the splash plates 72 is an elongated deflector plate 76. Preferably, the plate 76 extends beneath the rump restrainer 62 and is inclined downwardly for deflecting fluid material to the gutter 32 as it is deflected thereto from the splash plates 72. The angle of inclination of the deflector plate 76, as well as its effective width, is such as to accommodate access to the cows through the openings 74 while yet being supported for performing its desired functions.

OPERATION

The operation of the described embodiment of the subject invention is believed to be clearly apparent and is briefly summarized at this point.

In order to utilize the portable stand 10, in converting "flat" barns to "herringbone" barns, in the construction of new barns or even for performing milking operations in areas outside of milking barns, the stalls 12 and 14, previously fabricated at a workshop remote from its point of use, are positioned by skidding into a desired position wherein the stalls are in spaced parallelism with the rump restrainers 62 being in juxtaposition. In this disposition the stalls form mirror image of each other. Once the stalls are appropriately positioned, they are secured in place through the use of the base beams 16 affixed thereto, preferably at the lowest point avaiable so as to prevent the striking of feet and the like as the workmen pass thereover. The ramps 52 and 54 next are secured in place, preferably by welding. Thus, the milking stand 10 is ready for operational use. With the gates 58 pivoted to the closed position and secured in place, through the latching mechanism, not shown, the gates 56 are opened so that cows are permitted to file inwardly across the ramp 52 into the stall 12. As the lead cow approaches the gate 58, she is turned, by the gate, so that her rump is received by the rump restrainer 62 and her head positioned between the firs panel 40 and the gate. When so positioned, the cows are inclined with respect to the longitudinal axes of the stalls in a "herringbone" fashion. Of course, where the panels 40 are pivoted, it is desirable to have a workman positioned at locations such that he can manipulate the gates as the cows are received. Where the panels 40 are rigidly secured in place, it is necessary only for the workman to direct the cows' heads between the panels 40 as the cows file into the stalls. Once a sufficient number of cows are confined within the stalls 12, the gates 56 are pivoted to their closed positions, and latched, for restraining the cows against passage therefrom. Thus the cows are restrained by the panels 40, the rump restrainer 62, and the gates 56 and 58 during milking operations. The opening 74 affords access to the udders whereby each of the cows can, in turn, be coupled with a suitable milking machine.

Preferably, the stalls 12 and 14 are employed concurrently so that they are filled and discharged simultaneously for accommodating an efficient use of milking equipment, not shown, by workmen as they pass between the stalls 12 and 14 of the stand 10. Upon completion of each milking operation, the gates 58 are opened and the cows permitted to file out across the ramps 54. In the event the panels 40 require pivoting displacement, workmen suitably stationed manipulate the panels 40 as they urge the cows from the stalls. Of course, during the milking operation, should the cows discharge waste, the waste is deflected by the splash plate 72 and the deflector plate 76 into the gutter 32, and conveyed therefrom in any suitable manner.

If it is desired to provide the cow with salt, minerals, water, feed or the like, such can be deposited within the trough 38 for consumption during milking operations.

In view of the foregoing it should readily be apparent that the stand of the instant invention provides a practical solution of the problem of establishing a "herringbone" barn, whether through conversion of a "flat" barn or new construction.

Although the invention has been herein shown and described in what is conceived to be the most practical and preferred embodiments, it is recognized that any departures may be made therefrom within the scope of the invention.

Having described my invention, what I claim as new and desire to secure by Letters Patent is:

1. A portable milking stand for supporting a plurality of milch cows in a herringbone orientation comprising:
   A. a pair of laterally spaced, elongated milking stalls each including a laterally extended floor for receiving thereon a plurality of milch cows arranged in substantial parallelism;
   B. means for supporting said stalls for lateral displacement including a plurality of elongated skids arranged in substantial parallelism and paralleling the longitudinal axis of each of said milking stalls;
   C. means for restraining a plurality of milch cows in substantial parallelism including a plurality of substantially parallel panels diagonally related to a longitudinal axis of symmetry of each of said stalls and spaced at equidistances therealong, a pair of juxtaposed rump restrainers for simultaneously receiving and restraining said milch cows including a plurality of transverse splash plates and a plurality of vertically spaced side rails for accommodating access to the udders of cows restrained thereby and a pair of head rails extended along the outermost edges of each of said stalls in spaced relation with said rump restrainers;
   D. a gutter disposed beneath the splash plates of each rump restrainer of said pair;
   E. an ingress and an egress ramp affixed to the opposite ends of each of said stalls;
   F. a gate located at the opposite end of each of said stalls for controlling ingress and egresss; and
   G. coupling means coupling said stalls into an integrated milking stand including a plurality of transverse beams extended between said stalls and rigidly affixed thereto.

2. In a portable milking stand for supporting a plurality of milch cows in a herringbone orientation comprising:
   A. a pair of laterally spaced, elongated milking stalls, each including a laterally extended floor for receiving thereon a plurality of milch cows arranged in substantial parallelism;
   B. means for restraining a plurality of milch cows in substantial parallelism including a plurality of substantially parallel panels diagonally related to a longitudinal axis of symmetry of each of said stalls and spaced at equidistances therealong, a pair of juxtaposed rump restrainers for simultaneously receiving and restraining said milch cows including a plurality of transverse splash plates and a plurality of side rails for accommodating access to the udders of cows restrained thereby and a pair of head rails extended along the outermost edges of each of said stalls in spaced relation with said rump restrainers;
   C. a gutter disposed beneath the splash plates of each rump restrainer of said pair of rump restrainers;
   D. an ingress and an egress ramp affixed to the opposite end of each of said stalls;
   E. a gate located at the opposite end of each of said stalls for controlling ingress and egress; and
   F. coupling means coupling said stalls into an integrated milking stand incluidng a plurality of transverse beams extended between said stalls and rigidly affixed thereto.

3. In a portable milking stand, the improvement comprising:
   A. an elongated milking stall including a laterally extended floor for receiving thereon a plurality of milch cows arranged in substantial parallelism;
   B. restraining means for simultaneously restraining a plurality of milch cows in substantial parallelism including a plurality of vertically oriented, substantially parallel panels diagonally related to a longitudinal axis of symmetry of said stall and spaced at equidistances therealong for receiving therebetween a plurality of milch cows, a rump restrainer for simultaneously receiving the rearmost portions of a plurality of milch cows received between said parallel panels, comprising means defining a plurality of transverse splash plates orthogonally related to the longitudinal axis of said plurality of cows for deflecting waste discharged therefrom, and means defining a plurality of openings for accommodating simultaneous access to the udders of said plurality of cows and a head rail extended along the outermost edge of said stall in spaced parallelism with said rump restrainer for receiving the heads of said plurality of cows;
   C. a gutter disposed beneath the plurality of splash plates for receiving waste discharged from said plurality of cows;
   D. an ingress and an egress ramp affixed to the opposite ends of said stall for facilitating ingress and egress of said plurality of cows; and
   E. a gate located at each of the opposite ends of said stall for controlling ingress and egress of said cows.

* * * * *

UNITED STATES PATENT OFFICE
CERTIFICATE OF CORRECTION

Patent No. 3,828,733　　　　　　　　Dated August 13, 1974

Inventor(s)　　Manuel G. Correia

It is certified that error appears in the above-identified patent and that said Letters Patent are hereby corrected as shown below:

Column 2, line 4, delete "milchcows" and insert

---milch cows---; and line 31, delete "deisgnate" and insert

---designate---.

Column 6, line 26, delete "firs" and insert ---first---.

Column 7, line 34, delete "egresss" and insert ---egress---.

Column 8, line 11, delete "end" and insert ---ends---.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents